(12) United States Patent
Bennett et al.

(10) Patent No.: US 10,243,888 B2
(45) Date of Patent: Mar. 26, 2019

(54) METHOD AND APPARATUS TO ESTABLISH COMMUNICATION FOR LAYER 2 SWITCHED PACKETS WITH NETWORK ADDRESS TRANSLATION (NAT)

(71) Applicant: CISCO TECHNOLOGY, INC., San Jose, CA (US)

(72) Inventors: Marc Bennett, San Jose, CA (US); Yen Teresa Nguyen, San Jose, CA (US); Jonathan Harrod, San Jose, CA (US); Charles Wu, San Jose, CA (US); Aijaz Pathan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 15/495,605

(22) Filed: Apr. 24, 2017

(65) Prior Publication Data

US 2017/0230309 A1 Aug. 10, 2017

Related U.S. Application Data

(63) Continuation of application No. 13/686,247, filed on Nov. 27, 2012, now Pat. No. 9,661,031.

(51) Int. Cl.
*H04L 12/931* (2013.01)
*H04L 29/12* (2006.01)

(52) U.S. Cl.
CPC .......... *H04L 49/351* (2013.01); *H04L 61/103* (2013.01); *H04L 61/2007* (2013.01);
(Continued)

(58) Field of Classification Search
CPC . H04L 49/351; H04L 61/103; H04L 61/2007; H04L 61/2514; H04L 61/2528; H04L 61/256; H04L 61/6022
See application file for complete search history.

(56) References Cited

U.S. PATENT DOCUMENTS 6,266,335 B1   7/2001   Bhaskaran .................... 370/389
7,453,852 B2   11/2008  Buddhikot .................... 370/331
(Continued)

OTHER PUBLICATIONS

Sakun Sharma, "Overview of Layer 2 Switched Networks and Communication," Jul. 23, 2011, Cisco Support Community. <https://supportforums.cisco.com/document/68421/overview-layer-2-switched-networks-and-communication>.

*Primary Examiner* — Jerry B Dennison
(74) *Attorney, Agent, or Firm* — Haynes and Boone, LLP

(57) ABSTRACT

Methods and systems according to one or more embodiments establish communication across separate IP domains that are on the same layer 2 bridged domain. In an embodiment, a method includes receiving a configuration of a first IP address of a first node on a first side of a switch and a second IP address of a second node on a second side of the switch, wherein the first and second IP addresses are of different domains and are to be translated in each direction with respect to the switch, wherein the switch further comprises an integrated block adapted to do translation at line rate. Based on the configuration, the method also includes modifying, by the switch, packets of an applicable protocol in each direction so that the first and second IP addresses are changed for each domain such that either side of the switch acts as if an opposite side is on the same domain so that layer 2 communication is established.

20 Claims, 6 Drawing Sheets

(52) U.S. Cl.
CPC ........ *H04L 61/256* (2013.01); *H04L 61/2514*
(2013.01); *H04L 61/2528* (2013.01); *H04L*
*61/6022* (2013.01)

(56) References Cited

U.S. PATENT DOCUMENTS

| | | | | |
|---|---|---|---|---|
| 7,570,625 | B1 | 8/2009 | Ocepek | 370/310 |
| 7,693,158 | B1* | 4/2010 | Carrie | H04L 12/4641 |
| | | | | 370/395.53 |
| 7,796,614 | B1* | 9/2010 | Weymans | H04L 12/4625 |
| | | | | 370/395.4 |
| 7,839,855 | B2 | 11/2010 | Volt | 370/392 |
| 8,112,545 | B1 | 2/2012 | Ong | 709/202 |
| 8,788,709 | B1 | 7/2014 | Ong | 709/202 |
| 9,661,031 | B1* | 5/2017 | Bennett | H04L 61/103 |
| 2004/0052216 | A1* | 3/2004 | Roh | H04L 12/2856 |
| | | | | 370/252 |
| 2009/0086728 | A1* | 4/2009 | Gulati | H04L 61/2507 |
| | | | | 370/389 |
| 2009/0296718 | A1* | 12/2009 | Gefflaut | H04L 12/4679 |
| | | | | 370/395.53 |
| 2010/0098073 | A1* | 4/2010 | Tanaka | H04L 12/4625 |
| | | | | 370/389 |
| 2011/0222538 | A1* | 9/2011 | Singh | H04L 45/50 |
| | | | | 370/392 |
| 2011/0317703 | A1 | 12/2011 | Dunbar | 370/392 |
| 2012/0014387 | A1 | 1/2012 | Dunbar | 370/395.53 |
| 2012/0191875 | A1* | 7/2012 | Kano | H04L 61/103 |
| | | | | 709/245 |
| 2014/0079072 | A1* | 3/2014 | Shechter Gelles | H04L 49/354 |
| | | | | 370/395.53 |
| 2016/0352682 | A1* | 12/2016 | Chang | H04L 61/6022 |
| 2017/0041227 | A1* | 2/2017 | Zhou | H04L 45/74 |
| 2017/0230309 | A1* | 8/2017 | Bennett | H04L 61/256 |

* cited by examiner

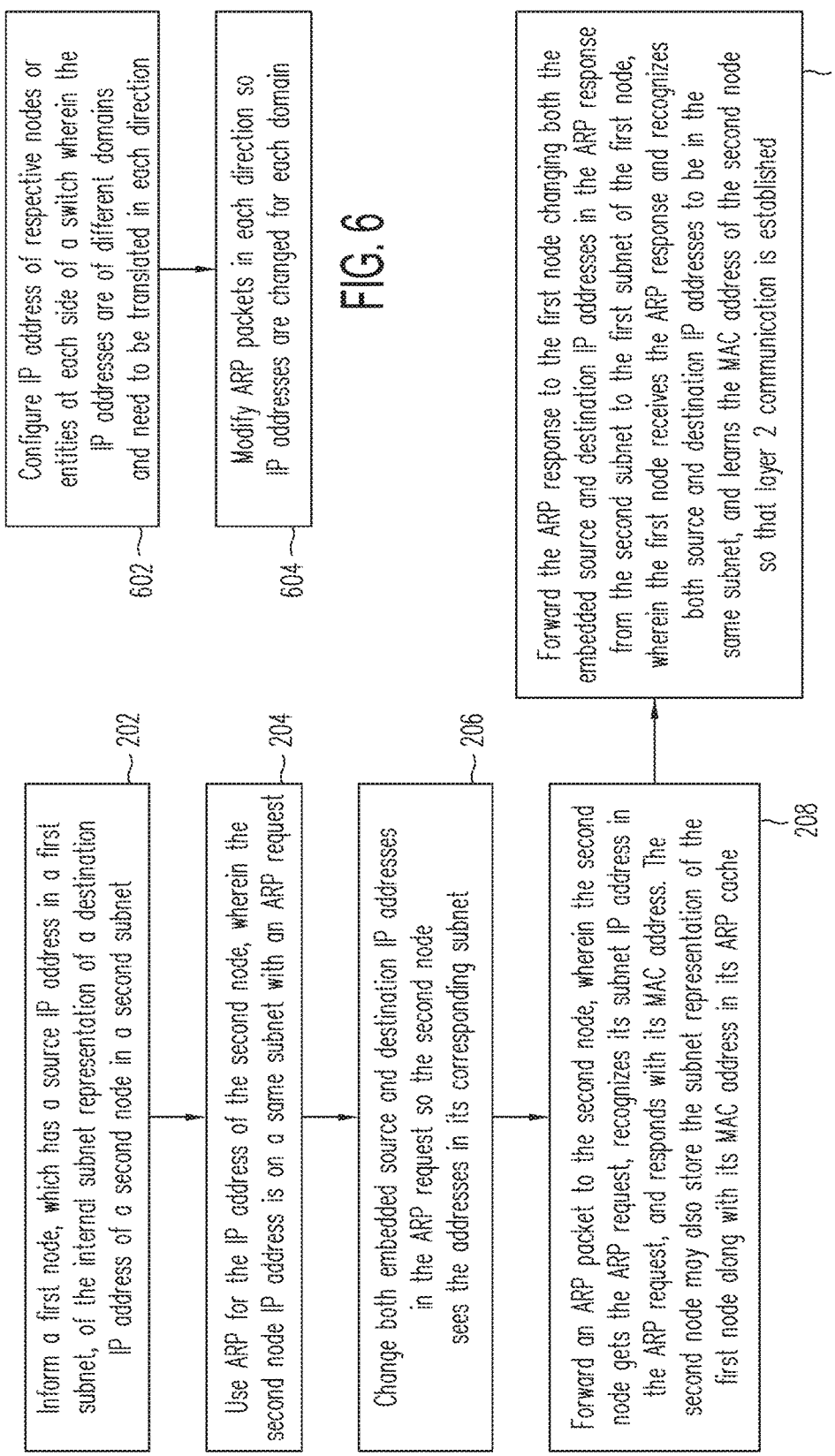

METHOD AND APPARATUS TO ESTABLISH COMMUNICATION FOR LAYER 2 SWITCHED PACKETS WITH NETWORK ADDRESS TRANSLATION (NAT)

CROSS-REFERENCE TO RELATED APPLICATIONS

This application is a continuation of U.S. patent application Ser. No. 13/686,247 filed on Nov. 27, 2012, the full disclosure of which is incorporated by reference herein in its entirety and for all purposes.

TECHNICAL FIELD

The present disclosure relates generally to computer networking, and more specifically, to establishing communication for layer 2 switched packets with Network Address Translation.

BACKGROUND

Switching technologies are very important to network design because they allow traffic to be sent only where it is needed.

A data link layer is layer 2 of the seven-layer Open Systems Interconnection model (OSI model) of computer networking. It corresponds to, or is part of the link layer of the TCP/IP reference model. The data link layer is the protocol layer that transfers data between adjacent network nodes in a wide area network or between nodes on the same local area network segment. The data link layer provides the functional and procedural means to transfer data between network entities and may provide the means to detect and possibly correct errors that may occur in the physical layer. Examples of data link protocols include Ethernet for local area networks (multi-node) and Point-to-Point Protocol (PPP).

In general, layer 2 switching is hardware-based, which means it uses media access control address (MAC address) from a host's network interface cards (NICs) to decide where to forward frames. Switches may use application-specific integrated circuits (ASICs) to build and maintain forwarding tables (also known as MAC address tables). A layer 2 switch may be considered to be similar to a multiport bridge.

In computer networking, network address translation (NAT) is a process for modifying IP address information in IP packet headers while in transit across a traffic routing device.

On devices that use ASICs to switch packets at layer 2 of the OSI model, one way to implement NAT is to process packets in the CPU or to add an FPGA component to achieve line rate performance. However, due to the layer 3 nature of NAT, packets flowing across a NAT boundary from one IP sub domain to another while maintaining the same layer 2 domain structure may lead to breakdown of conventional communication between network nodes. This is mainly because a protocol such as Address Resolution Protocol (ARP) may not work as expected in this scenario.

BRIEF DESCRIPTION OF THE DRAWINGS

FIG. 2 is a flow diagram illustrating a method for establishing layer 2 initial communication across separate IP domains on the same layer 2 bridged domain according to an embodiment of the present disclosure;

FIG. 6 is a flow diagram illustrating a method for generally establishing layer 2 initial communication according to an embodiment of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION OF EXAMPLE EMBODIMENTS

Overview

Methods and systems for establishing communication for layer 2 switched packets with Network Address Translation (NAT) in computer networking are disclosed according to one or more embodiments. Certain protocols like ARP (Address Resolution Protocol), ICMP (Internet Control Message Protocol), etc. may not work transparently across layer 2 NAT (hereinafter referred to as "L2 NAT"). In embodiments herein, for simple switching applications such as those used in Industrial Ethernet (IE), issues of breakdown of conventional communication between network nodes may be addressed by "fixing up" the applicable protocol such as ARP.

In one or more embodiments, a user configures IP addresses that are to be translated in each direction to/from opposite sides of a switch. It should be noted that in embodiments herein, "side" or "sides" of a switch may refer to either a public or private link of, for example, an Ethernet switch. Based on this configuration, the switch modifies applicable protocol packets ("fix up"), e.g., ARP packets, in each direction so that the IP addresses may be changed for each domain or subnet, thereby "tricking" each side to think that the other side is on the same subnet. As such, embodiments of the present disclosure may establish initial communication across separate IP subnets or domains on the same layer 2 bridged domain. This may be used if NAT is desired on bridged or switched packets.

Advantageously, one or more embodiments herein may not require an applicable protocol proxy agent such as an ARP proxy agent to establish layer 2 communication for NAT'ed packets. Instead, outgoing and incoming protocol packets such as ARP packets may be modified to accomplish the communication, thus only involving minimal user configuration and quick data path processing.

Example Embodiments

Figure 1:
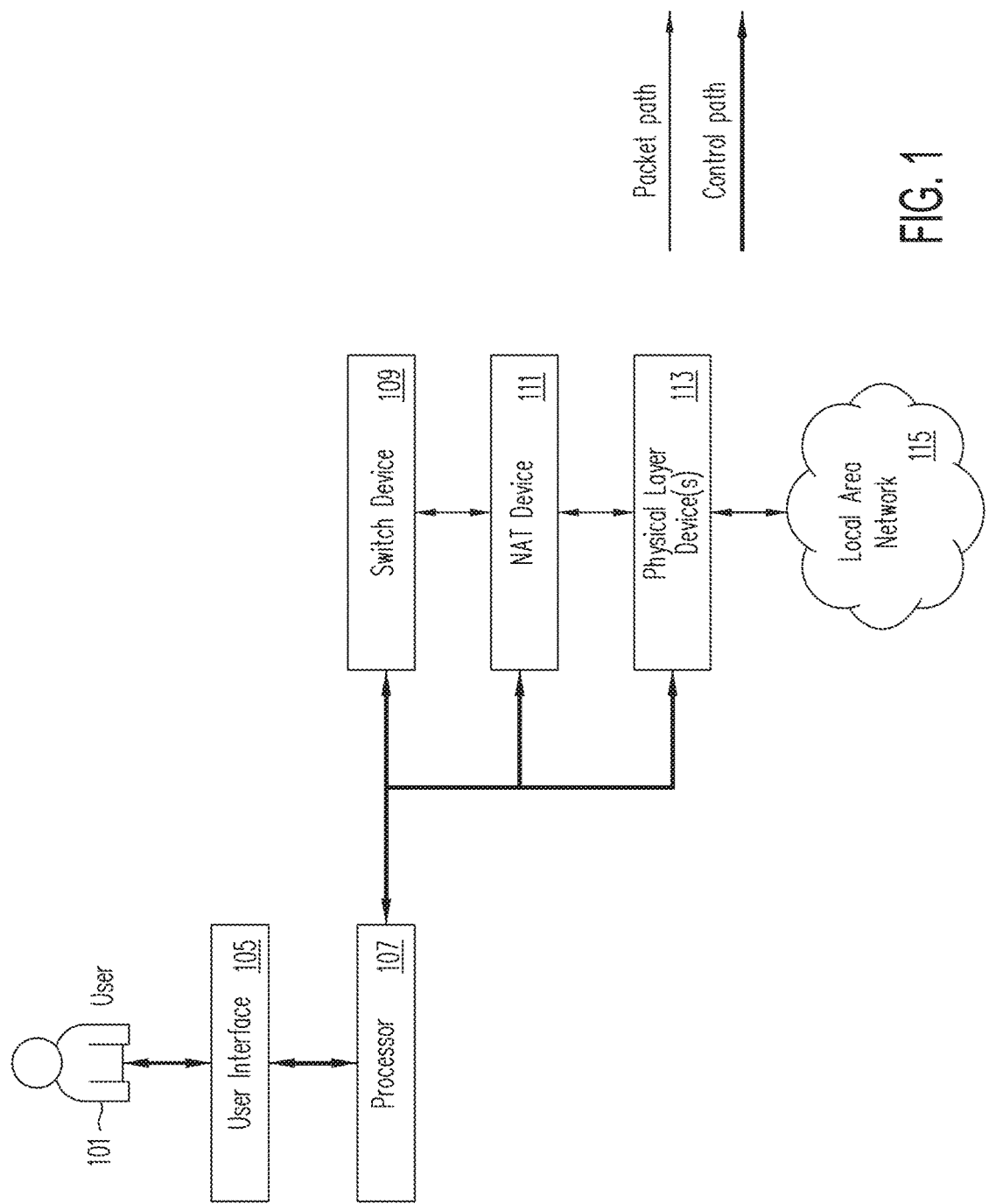
FIG. 1 is a diagram illustrating a layer 2 NAT (L2 NAT) system overview according to an embodiment of the present disclosure.

Referring to FIG. 1, a diagram illustrating a layer 2 NAT (L2 NAT) system overview is shown according to an embodiment of the present disclosure.

A user 101 may use a user interface 105 to control the configuration of one or more switch components including a switch device 109, a L2 NAT device 111 and/or one or more physical layer devices 113. A processor 107 is a computational device that may allow user 101 to control the switch's components and report status to the user.

Switch device 109 may perform all layer 2 switching operations, including how to forward incoming packets.

L2 NAT device 111 may perform line rate IP address translation of packets as they flow through the switch components. In one or more embodiments, L2 NAT device 111 may include logic circuitry to facilitate transparent IP address translations including, for example, ARP and ICMP, as may be provisioned by system software.

Physical layer device(s) 113 may provide an interface to a physical medium. For example, Ethernet, which may be defined to operate over both copper, optical fiber, and/or other appropriate mediums.

In general, a control path flow may involve a flow from user 101 via user interface 105 to processor 107 to switch device 109, NAT device 111, and Physical Layer Devices(s) 113. A packet path flow may involve a flow from switch device 109 to NAT device 111 to Physical Layer Device(s) 113 to a network such as a Local Area Network 115. It should be understood that a control path may flow in a reverse direction, for example, to provide status or reports to user 101. Similarly, a packet path may be bi-directional and flow in a reverse direction (e.g., to or from one node to another).

Figure 1A:
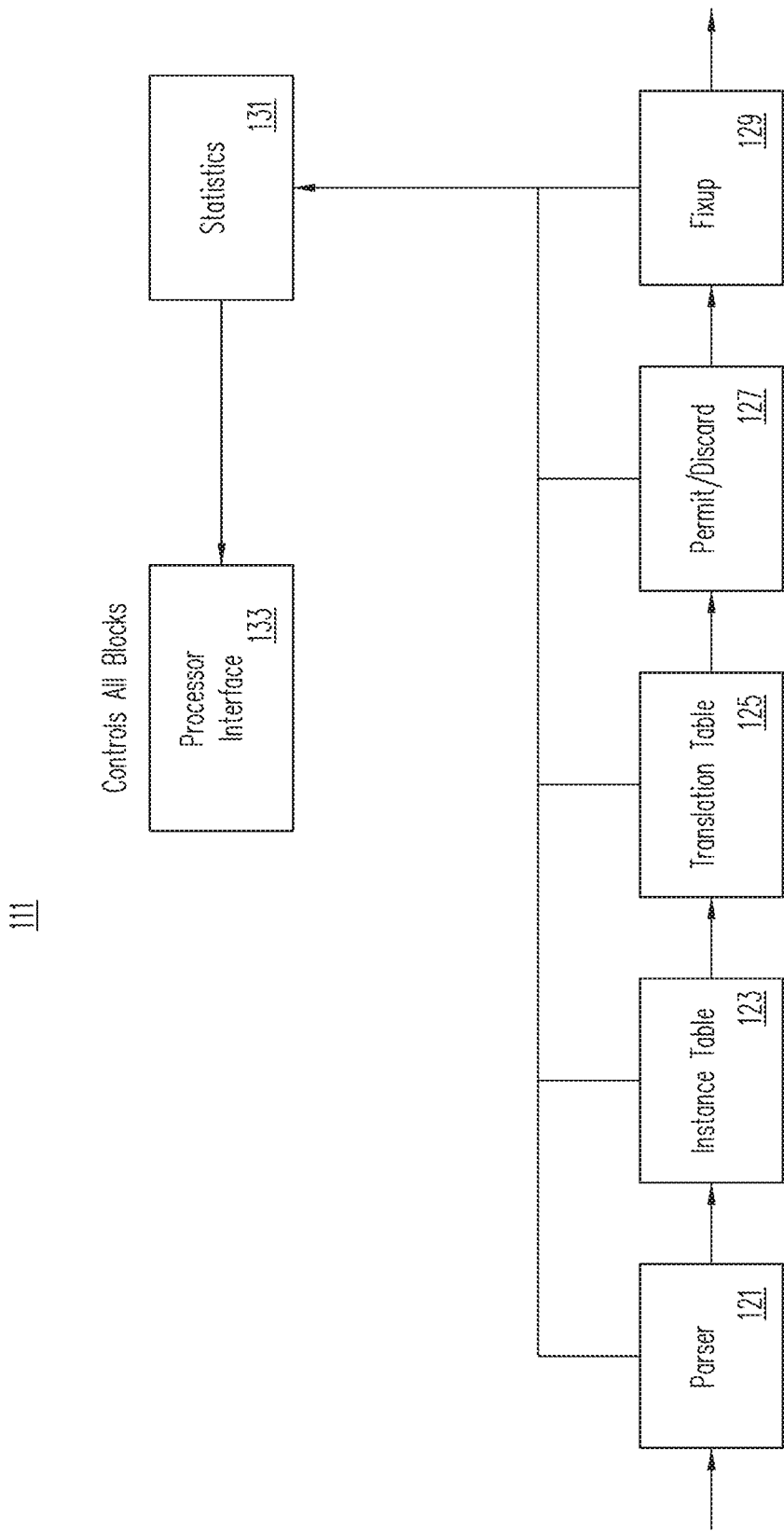
FIG. 1A is a block diagram illustrating the L2 NAT device 111 of the system of FIG. 1 according to an embodiment of the present disclosure.

Referring to FIG. 1A, a block diagram illustrating the L2 NAT device 111 of the system of FIG. 1 is shown according to an embodiment of the present disclosure.

In one or more embodiments, the L2 NAT device 111 may comprise various blocks including a parser 121, an instance table 123, a translation table 125, a permit/discard block 127, a Fixup block 129, a statistics block 131 and a processor interface 133.

Parser 121 may determine the type of packet that may be incoming so that downstream blocks may process the packet properly based on software provisioning of the system. For example, if an ARP packet is recognized, then Fixup block 129 may be informed that extra processing (e.g., both source and destination address translation) may be required for this packet.

For each packet interface, which may be defined by e.g., port/VLAN combination, various controls may be provisioned by user 101 in Instance Table 123 regarding the desired handling of an incoming packet. These controls may include, for example: whether various protocols require "inside" or "outside" translation; which protocols require NAT support; and/or whether various protocol messages should be forwarded or discarded. For example, if a packet's IP address does not match an entry in Translation Table 125, it may be optionally discarded or forwarded. Translation Table 125 may use the VLAN ID, and port as a key, and may report the corresponding controls so that packets matching the key may be processed as desired.

Translation Table 125 may define all or some of the desired IP address translations. After parser 121 extracts the IP addresses of the incoming packets, Translation Table 125 may be searched for a matching entry. If there is a match, the translated address may be reported so Fixup block 129 may make a required substitution.

Based on the settings of Instance Table 123, certain protocols of an instance (or packets not matching Translation Table 125 entries) may be flagged for "discard" at Permit/Discard block 127. That is, packets matching a programmed description are not forwarded. Conversely, packets not matching the programmed description are permitted or forwarded. Advantageously, this may be useful for filtering out extraneous messages, and for preventing improper behavior in the system or network.

Fixup block 129 may perform IP address translations both in an IP header and in a payload of selected protocols (e.g., ARP, ICMP, etc.). Also, Fixup block 129 may correct header checksums, and layer 2 Cylic Redundancy Checks [CRC] so that downstream devices will not discard the translated packet.

Statistics block 131 may implement information about the behavior of the system. For instance, user 101 may access the count of various types of events such as total packets, ARP fixups, dropped packets, etc. As such, the behavior of the system may be monitored.

Processor Interface 133 may provide a way for communication with the system processor 107 for control and monitoring of the system.

In an embodiment wherein a first network includes a node A, which may have a "private" IP address and is positioned on one side of a switch, for example, connected on an internal link of an Ethernet switch (i.e., downlink ports), and a second device includes a node B, which may have a "public" IP address and is positioned on another side of the switch, for example, connected to an external entity (e.g., an external node of a device or a network) using an external link of the same Ethernet switch (i.e., uplink port), it may be desirable to establish a switched layer 2 connection between Node A and Node B across the switch. It should be noted that in embodiments herein, "side" may refer to either an internal or external link of, for example, an Ethernet switch.

To establish layer 2 communication with devices or networks in the same switching domain or subnet, the TCP/IP stack of Node A uses an applicable protocol, for example, ARP. However, protocols such as ARP may generally only be used for devices with IP addresses on the same subnet, for example, only for private IP addresses. In an embodiment where the IP address of Node B is a public address, ARP may not be used as is because Node B is on a different subnet. As such, Node B may need another representation of its public IP address in the private subnet so that Node A treats the destination IP address of node B as being on the same subnet as itself, thus being able to use ARP.

In an embodiment, Node A may be informed of the internal representation of the external IP address. For example, the public IP address of Node B may be represented in the private subnet. Node A may then use ARP for that address as it is now on the same subnet with an ARP request. Before forwarding an ARP packet, the switch changes both the embedded source and destination IP addresses in the ARP request from "private" to "public" so that node B sees the expected addresses. Node B then gets the ARP request, recognizes its "public" IP address in the ARP request, and responds with its MAC address. Node B may also store the "public" representation of node A along with its MAC address in its ARP cache. The switch sees this ARP response, and forwards it back to node A, but now it changes both the embedded source and destination IP addresses in the ARP response from "public" to "private." Node A receives the ARP response and recognizes both source and destination IP addresses to be in the same "private" subnet, and learns the MAC address of Node B. Thus, layer 2 communication may be initially established.

As such, a user may configure source and destination IP addresses of respective nodes at each side of a switch wherein the IP addresses are of different domains and need to be translated in each direction. For instance, a user may configure the IP address translation that may be needed for both source AND destination IP addresses for packets going from the private network to the public network. Because this communication may be bi-directional, the same entries may be used for traffic in an opposite direction with source and destination IP addresses swapped.

Referring to FIG. 2, a flow diagram illustrates a method for establishing layer 2 initial communication across separate IP domains on the same layer 2 bridged domain according to an embodiment of the present disclosure. The method of the embodiment of FIG. 2 may be implemented by the system illustrated in the embodiment of FIG. 1.

In block 202, a first node in a first subnet having for example a private IP address is informed of the internal representation of an external IP address of a second node in a second subnet having for example a public IP address.

In block 204, an applicable protocol, for example ARP, is used for the IP address of the second node, wherein the second node IP address is on a same subnet with an ARP request.

In block 206, both embedded source and destination IP addresses are changed in the ARP request, for example from "private" to "public" so the second node sees the expected addresses.

In block 208, the ARP packet is forwarded, e.g., by a switch, to the second node, wherein the second node gets the ARP request, recognizes its subnet IP address, for example "public" IP address, in the ARP request, and responds with its MAC address. The second node may also store the subnet representation, for example "public" representation, of the first node along with its MAC address in its ARP cache.

In block 210, the ARP response is forwarded, e.g., by the switch, to the first node changing both the embedded source and destination IP addresses in the ARP response from the second subnet to the first subnet of the first node, for example from "public" to "private". The first node receives the ARP response and recognizes both source and destination IP addresses to be in the same subnet, for example "private" domain, and learns the MAC address of the second node so that layer 2 communication is established.

For this to happen, a user may configure the IP address translation to be used for both source AND destination IP addresses for packets going from one subnet to another, for example, from the private network to the public network. The communication is bi-directional, therefore, the same entries may be used for traffic in the opposite direction with source and destination IP addresses swapped.

As such, embodiments of the present disclosure may establish initial communication across separate IP subnets or domains on the same layer 2 bridged domain. This may be used if NAT is desired on bridged or switched packets.

Advantageously, embodiments herein may not require an applicable protocol proxy agent, for example an ARP proxy agent, to establish layer 2 communication for NAT'ed packets. Instead, outgoing and incoming packets (e.g., ARP packets) are modified to accomplish the communication, thus only involving minimal user configuration and line rate data path processing.

In this regard, for example, if an interface is Gigabit Ethernet, frames are generally translated at Gigabit per second speed. Generally, if software processes the frames, this process may be much slower (not line rate). There is no guarantee of line rate translation because it depends on CPU processing power. In embodiments herein, which may comprise a hardware solution, advantageously, the processor may be freed of this computationally-intensive work, to perform other important tasks.

Figure 3:
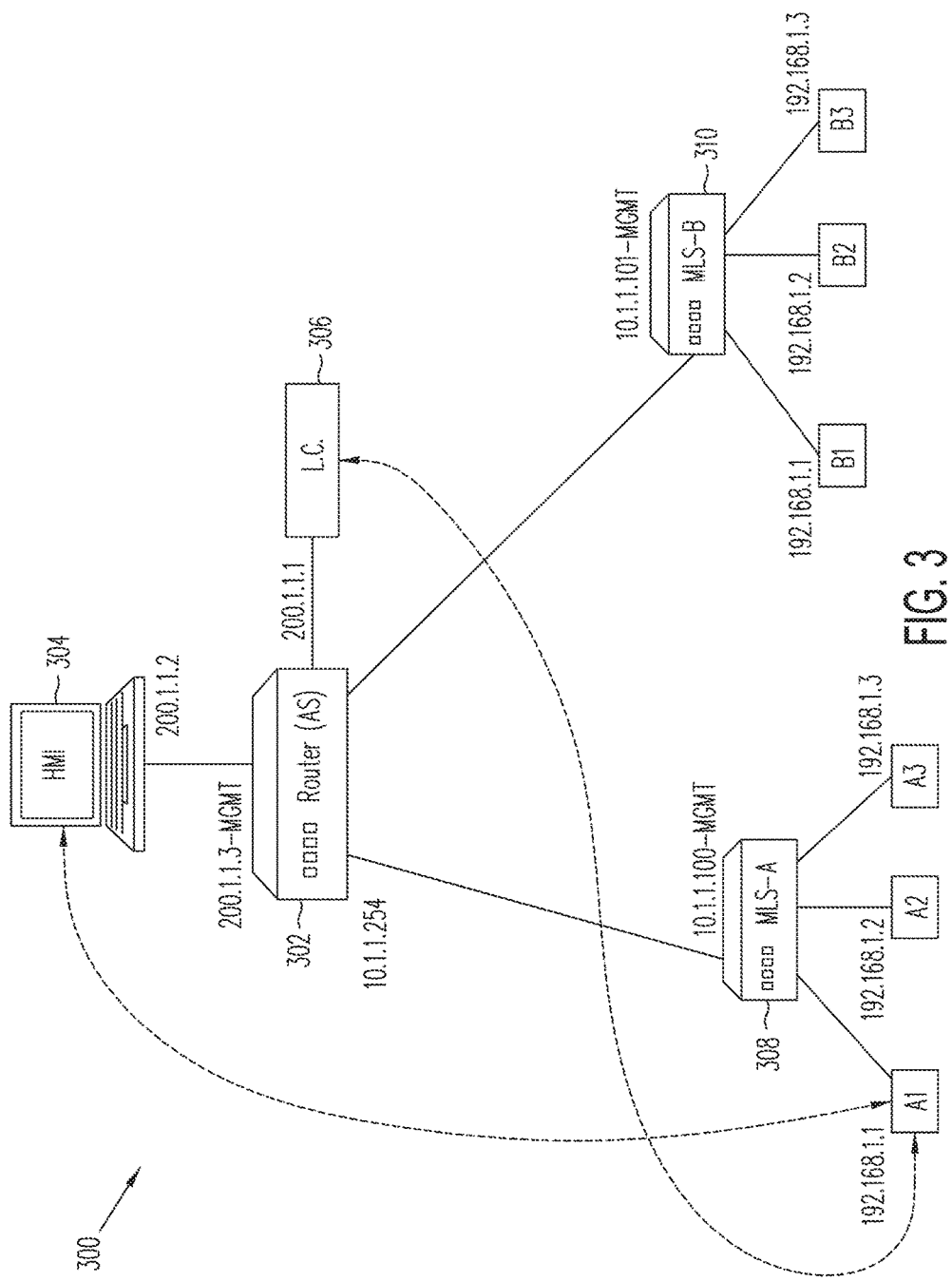
FIG. 3 is a diagram illustrating a switch used in a network configuration using NAT for communication between one or more machine nodes and one or more elements beyond a router according to an embodiment of the present disclosure.

Referring to FIG. 3, a switch used in a network configuration using NAT for communication between one or more machine nodes and one or more elements beyond a router is illustrated according to an embodiment of the present disclosure.

In one or more embodiments, a machine level switch ("MLS") such as a machine-level Industrial Ethernet (IE) switch may be used in certain network configurations that may require supporting IP Network Address Translation (NAT) in Layer 2 switched configurations in networks such as IE networks.

In general, deployments such as Industrial Ethernet deployments may include machine nodes and external controlling entities such as Line Controllers (LCs). Machine nodes may usually be connected on the internal links of an Ethernet switch located close to the nodes. This switch aggregates the internal traffic and switches it to the external entities using "uplinks". These machine nodes come up with pre-configured IP addresses in most deployments, which may lead to the issue that multiple nodes may come up with duplicate IP addresses. This requires a NAT mechanism so that addresses appearing on the uplinks are unique. A switch based platform, for example as part of an ASIC, may be used, and because it does not have any inbuilt NAT functionality, an integrated circuit (such as an ASIC or FPGA) translates IP addresses external to Layer 2 switching. For ingress packets NAT occurs before Layer 2 switching, and for egress packets NAT occurs after Layer 2 switching. In various embodiments, it may also be possible to integrate the Layer 2 switching and NAT functionality into a single device.

As described above, certain protocols like ARP, ICMP, etc. may not work transparently across L2 NAT. These protocols may be "fixed up" using, for example, Application Layer Gateways (ALG), or an integrated circuit device such as FPGA, which may provide line rate translation.

Network configuration 300 illustrated in the embodiment of FIG. 3 shows communications between one or more machine nodes and one or more elements beyond a router. For example, network configuration 300 shows communications between a node A1, which is on one side of a router 302, and an external element such as a human machine interface (HMI) 304 (e.g., a computer) or a Line Controller (LC) 306, which are beyond router 302. In an embodiment, an Aggregation Switch (AS) such as an Industrial Ethernet Aggregation Switch may act as router 302.

A network between MLS-A 308, MLS-B 310 and AS or router 302 is a "NAT'ed" network with unique IP addresses.

In this embodiment, a default router may be configured on node A1 as 192.168.1.254, which may actually represent 10.1.1.254. Global configuration may be done, for example, with an inside command using 192.168.1.1 to 10.1.1.1, and an outside command using 10.1.1.254 to 192.168.1.254. The configuration may be applied on the uplink and protocol (e.g., ARP) "fixup" may be enabled by default. When node A1 wants to communicate with LC 306, for example, it ARPs for Default Gateway with an embedded source IP address as 192.168.1.1 and a destination IP address as 192.168.1.254.

MLS-A 308 "fixes up" an ARP request so that the source IP address is changed to 10.1.1.1 and the destination IP address is changed to 10.1.1.254. MAC addresses are untouched.

AS 302 (or other router) receives the ARP request, and learns the MAC address corresponding to address 10.1.1.1, which actually represents node A1.

AS 302 sends an ARP response with embedded source IP address 10.1.1.254 and destination IP address as 10.1.1.1

MLS-A 308 "fixes up" the ARP response so that the source IP address is shown as 192.168.1.254, and the destination IP address is shown as 192.168.1.1.

Node A1 learns the MAC address corresponding to 192.168.1.254, which actually represents AS 302, and communication starts.

All data communication between a machine node and an external element, for example, between node A1 and LC 306 may have the LC's actual IP address (200.1.1.1) as the destination address. This does not need a NAT translation entry.

A similar flow may occur if initial communication is originated from the external element, for example, from LC 306.

Notably, communication to a management interface (e.g., 10.1.1.100 configured on a switch virtual interface (SVI) on MLS-A 308) is unaffected by NAT.

The above configuration according to one or more embodiments may use both "inside" and "outside" address configurations. However, an alternate configuration according to an embodiment may be done without the "outside" address configuration if the same subnet is divided into a unique and a portion.

In the alternate configuration the same subnet may be divided in an external and internal address space. Notably, an "uplink" address space is in the same subnet as the machine address space. However, the uplink address space has unique addresses only which are different from the machine level addresses.

Similar to the embodiment illustrated in FIG. 3, communication may be between a node A1 and a Line Controller 306 or HMI 304, which are beyond router 302. The network between the MLSs 308 or 310 and AS 302 is the "NAT'ed" network with unique IP addresses.

In this alternate embodiment, a Default Router may be configured on node A1 as, for example, 192.168.1.254. Global configuration may be, on the inside, 192.168.1.1 192.168.1.101—"192.168.1.101" is in the "unique" address range, while "192.168.1.1" is in the duplicate address range. It should be noted that an "outside" command for this configuration is not needed. The configuration may then be applied on the uplink. ARP "fixup" is enabled by default.

When node A1 wants to communicate with an external node or entity such as LC 306, it ARPs for Default Gateway with embedded source IP as 192.168.1.1 and destination IP as 192.168.1.254. MLS-A 308 "fixes up" the ARP request so that the source IP is changed to 192.168.1.101 and the destination IP is untouched. MAC addresses are untouched.

AS 302 (or other router) receives the ARP request and learns the MAC address corresponding to 192.168.1.101, which actually represents node A1.

AS 302 sends an ARP response with embedded source IP 192.168.1.254 and destination IP as 192.168.1.101.

MLS-A 308 "fixes up" the ARP response so the destination IP is shown as 192.168.1.1. The source IP is untouched.

Node A1 learns the MAC address corresponding to 192.168.1.254, which actually represents AS 302, and communication starts.

A similar flow may occur if initial communication is originated from L.C 306.

Also, communication to a management interface, which may have, for example an IP 192.168.1.150, is possible from both the internal network and external network.

Figure 4:
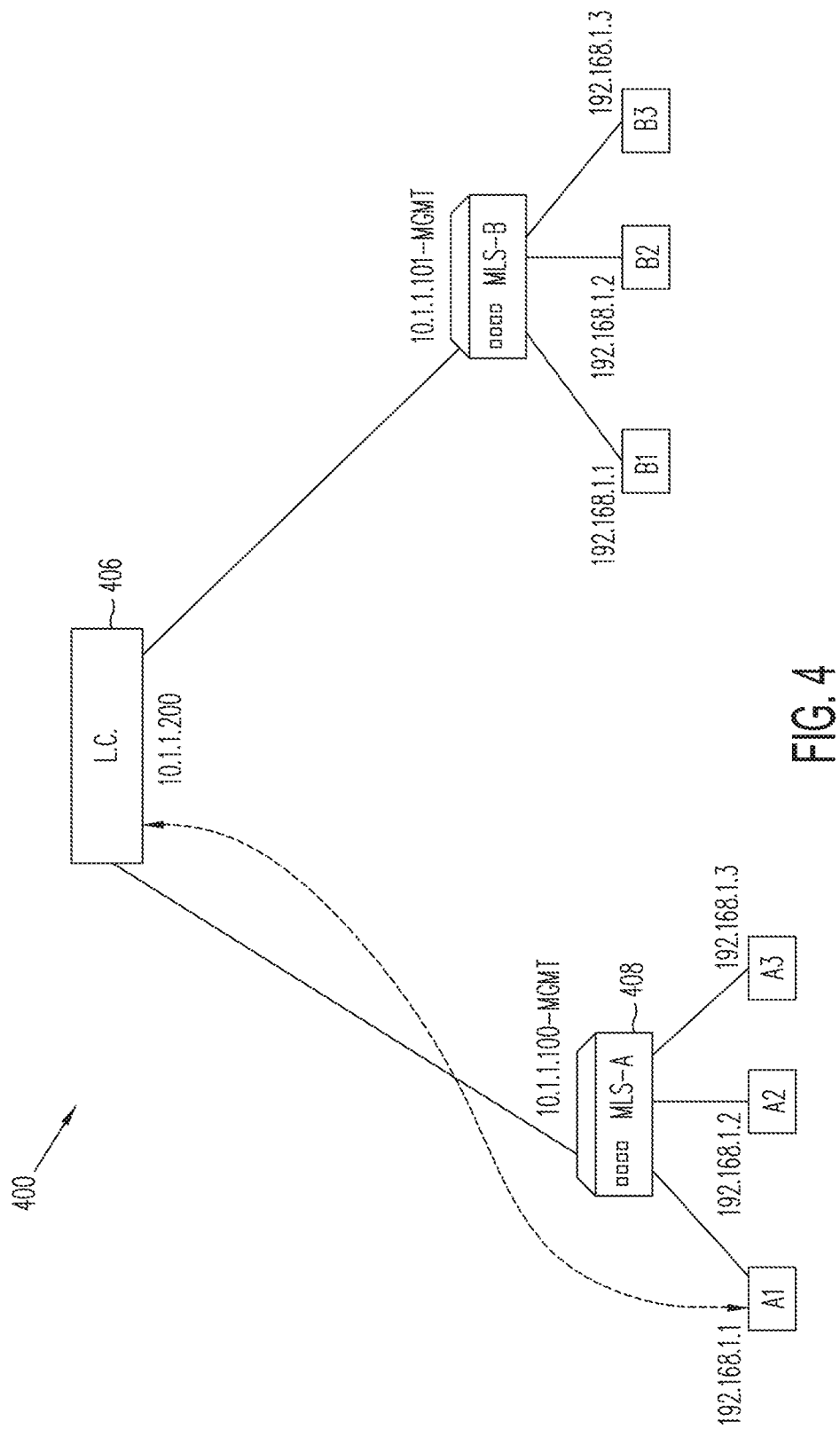
FIG. 4 is a diagram illustrating a switch used in a network configuration using NAT for communication between one or more machine nodes and one or more elements beyond the switch according to an embodiment of the present disclosure.

Referring now to FIG. 4, a switch used in a network configuration using NAT for communication between one or more machine nodes and one or more elements beyond the switch is illustrated according to an embodiment of the present disclosure.

In network configuration 400, communication is shown between a machine node A1 and a Line Controller (LC) 406, which is directly connected to an MLS-A 408 uplink.

For global configuration on MLS-A 408, an inside address command may use 192.168.1.1 10.1.1.1, and an outside address command may use 10.1.1.200 192.168.1.250. The configuration may be applied on the uplink. Applicable protocol "fixup" such as ARP "fixup" may be enabled by default.

When node A1 wants to communicate with LC 406, it ARPs, for example, for LC 406 with embedded source IP as 192.168.1.1 and destination IP as 192.168.1.250.

MLS-A 408 "fixes up" the ARP request so that the source IP is changed to 10.1.1.1 and the destination IP is changed to 10.1.1.200. MAC addresses are untouched.

LC 406 receives the ARP request and learns the MAC address corresponding to 10.1.1.1, which actually represents node A1.

LC 406 sends an ARP response with embedded source IP 10.1.1.200 and destination 10.1.1.1.

MLS-A 408 "fixes up" the ARP response so that the source IP is changed to 192.168.1.250, and the destination IP is changed to 192.168.1.1.

Node A1 learns the MAC address corresponding to 192.168.1.250, which actually represents LC 406, and communication starts.

A similar flow may occur if initial communication is originated from LC 406.

Also, a configuration similar to the alternate configuration described above may be possible if internal and external addresses are in the same subnet. That is, whereas the embodiment of FIG. 4 may use both "inside" and "outside" address configurations, an alternate configuration according to an embodiment may be done without the "outside" address configuration if the same subnet is divided into a unique and non-unique portion.

Figure 5:
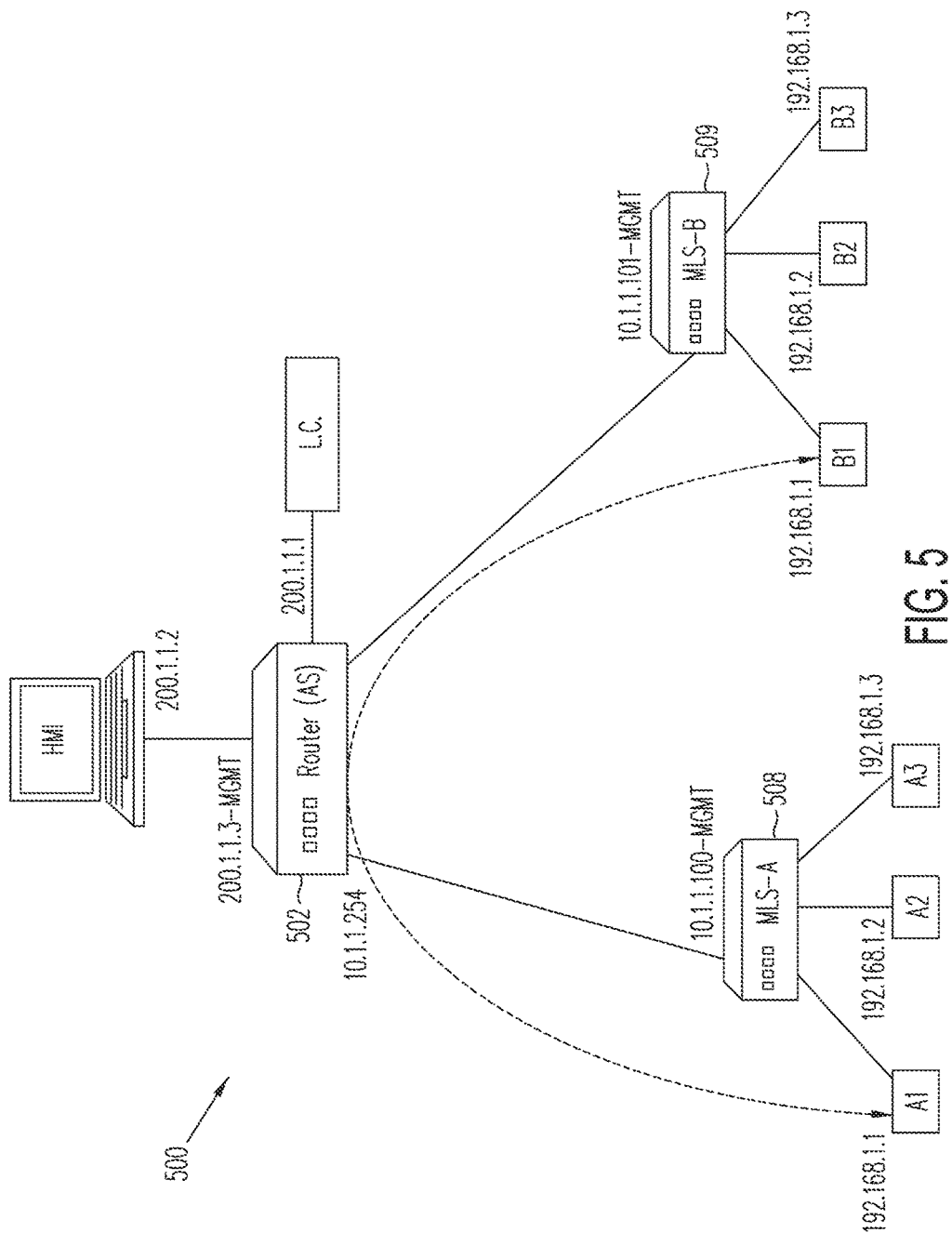
FIG. 5 is a diagram illustrating a switch used in a network configuration using NAT for communication between a first machine node and a second machine node according to an embodiment of the present disclosure.

Referring now to FIG. 5, a switch used in a network configuration using NAT for communication between a first machine node and a second machine node is illustrated according to an embodiment of the present disclosure.

Network communication 500 shows communication between machine nodes A1 and B1 with duplicate IP addresses, and which are connected to MLS-A 508 and MLS-B 509, respectively. AS 502 may act as a router for LC communication, but is switching traffic between MLS-A 508 and MLS-B 509. Network between the MLSs 508, 509 and AS 502 is a "NAT'ed" network with unique IP addresses.

Default Router may be configured on node A1 as 192.168.1.254, which actually represents 10.1.1.254. The same is true for node B1. 10.1.1.254 may be configured as an SVI so that this is shared as a common default gateway across the MLS network.

For global configuration on MLS-A 508, an inside address may be 192.168.1.1 10.1.1.1, and an outside address may be 10.1.1.254 192.168.1.254. Outside 10.1.1.21 192.168.1.253—10.1.1.21 should have a matching "inside" configuration on MLS-B 509. The configuration may then be applied on the uplink.

For global configuration on MLS-B 509, an inside address may be 192.168.1.1 10.1.1.21, and an outside address may be 10.1.1.254 192.168.1.254. Outside 10.1.1.1 192.168.1.253—10.1.1.1 should have a matching "inside" configuration on MLS-A 508. The configuration may then be applied on the uplink.

Note that for node A1 to communicate with node B1, MLS-A 508 and MLS-B 509 may have symmetric configurations for each direction.

ARP fixup is enabled by default. When node A1 wants to communicate with node B1, it may ARP for node B1 with an embedded source IP as 192.168.1.1 and a destination IP as 192.168.1.253.

MLS-A 508 "fixes up" the ARP request so that the source IP is changed to 10.1.1.1 and destination IP is changed to 10.1.1.21. MAC addresses are untouched.

MLS-B 509 "fixes up" the ARP request so that the source IP is changed to 192.168.1.253 and the destination IP is changed to 192.168.1.1. MAC addresses are untouched.

Node B1 receives the ARP request and learns the MAC address corresponding 192.168.1.253, which actually represents node A1.

Node B1 sends an ARP response with embedded source IP 192.168.1.1 and destination IP as 192.168.1.253.

MLS-B 509 "fixes up" the ARP response so that the source IP is changed to 10.1.1.21 and the destination IP is changed to 10.1.1.1.

MLS-A 508 "fixes up" the ARP response so that the source IP is changed to 192.168.1.253, and the destination IP is changed to 192.168.1.1.

Node A1 learns the MAC address corresponding to 192.168.1.253, which actually represents B1, and communication starts.

A similar flow may occur if initial communication is originated from node B1.

Note that IP 192.168.1.253 may be intentionally duplicated in both MLS-A 508 and MLS-B 509 private networks. In this case, communication may be provided when corresponding "public" addresses are unique.

Also, in this case, a configuration similar to the alternate configuration described above may be possible if internal and external addresses are in the same subnet. That is, whereas the embodiment of FIG. 5 may use both "inside" and "outside" address configurations, an alternate configuration according to an embodiment may be done without the "outside" address configuration if the same subnet is divided into a unique and non-unique portion.

In embodiments of the present disclosure, other network configurations may provide communication between one or more machine nodes and one or more elements such as LCs with duplicate IP addresses. Also, network configurations according to an embodiment may provide communication between a machine node and an outside network through an internal router. For example, communication may be provided between a node, which is behind a router in the machine network, and a Line Controller or HMI, which is beyond another router. In further embodiments, alternate configurations may also be possible if internal and external addresses are in the same subnet.

Referring to FIG. 6, a flow diagram illustrates a method for generally establishing layer 2 initial communication according to an embodiment of the present disclosure. The method of FIG. 6 may be implemented by any of the configurations illustrated in FIG. 1, 3, 4 or 5 according to one or more embodiments.

In block 602, a user may configure IP addresses that need to be translated in each direction. For instance, source and destination IP addresses of respective nodes at each side of a switch may be configured, wherein the IP addresses are of different domains and need to be translated in each direction. In various embodiments, the "switch" may include an integrated hardware block that may do NAT at line rate. For example, as described above with respect to the embodiments of FIGS. 1 and 1A, the "switch" may include a typical switch such as an ASIC plus a NAT device. In an embodiment, the "switch" may include an ASIC switch plus an FPGA.

In block 604, applicable protocol packets, for example ARP packets may be modified in each direction so IP addresses are changed for each domain. That is, based on the configuration, the switch modifies applicable protocol packets, for example, ARP packets, in each direction ("fixup") so that the IP addresses are changed for each domain, thereby "tricking" each side to think that the other side is on the same domain or subnet.

One or more embodiments herein may aid in establishing communication across separate IP domains on the same layer 2 bridged domain, which may arise in scenarios where NAT may be desired on bridged or switched packets. Embodiments herein do not require an applicable protocol proxy agent, for example an ARP proxy agent, to establish layer 2 communication for NAT'ed packets. Instead, outgoing and incoming packets, e.g., ARP packets, are modified to accomplish this, which requires minimal user configuration and some quick, line rate data path processing.

Therefore, it should be understood that embodiments herein may be practiced with modification and alteration within the spirit and scope of the appended claims. The description is not intended to be exhaustive or to limit the disclosure to the precise form disclosed. It should be understood that the disclosure may be practiced with modification and alteration and that the disclosure be limited only by the claims and the equivalents thereof.

The invention claimed is:

1. An Industrial Ethernet switch comprising:
   a downlink port configured to receive traffic from a first machine node with a pre-configured IP address;
   an uplink port configured to transmit the received traffic to an external entity; and
   one or more processors coupled between the downlink port and the uplink port and configured to perform network address translation on the received traffic, wherein the network address translation includes:
   determining whether the received traffic includes a protocol packet of a protocol that does not work transparently across the network address translation; and
   modifying a payload of the protocol packet when the received traffic includes the protocol packet.

2. The Industrial Ethernet switch of claim 1, wherein the pre-configured IP address is selected from a duplicate address range.

3. The Industrial Ethernet switch of claim 2, wherein the network address translation includes translating the pre-configured IP address to a unique IP address selected from a unique address range.

4. The Industrial Ethernet switch of claim 1, wherein the protocol packet includes one or more of an address resolution protocol (ARP) packet or an Internet control message protocol (ICMP) packet.

5. The Industrial Ethernet switch of claim 1, wherein the network address translation includes layer 2 network address translation (L2 NAT).

6. The Industrial Ethernet switch of claim 1, wherein modifying the payload of the protocol packet is performed at a line rate of the Industrial Ethernet switch.

7. The Industrial Ethernet switch of claim 1, wherein modifying the payload of the protocol packet is performed without a protocol proxy agent.

8. The Industrial Ethernet switch of claim 1, wherein modifying the payload of the protocol packet includes correcting a cyclic redundancy check of the protocol packet.

9. The Industrial Ethernet switch of claim 1, wherein modifying the payload of the protocol packet includes changing an embedded source IP address of the protocol packet without changing an embedded destination IP address of the protocol packet.

10. The Industrial Ethernet switch of claim 1, wherein modifying the payload of the protocol packet includes changing an embedded source IP address of the protocol packet and an embedded destination IP address of the protocol packet.

11. The Industrial Ethernet switch of claim 1, wherein modifying the payload of the protocol packet does not change any MAC addresses of the protocol packet.

12. The Industrial Ethernet switch of claim 1, wherein the external entity includes an Industrial Ethernet Aggregation Switch.

13. The Industrial Ethernet switch of claim 1, wherein the downlink port is further configured to receive traffic from a second machine node that shares the pre-configured IP address.

14. A method comprising:
receiving, via one or more downlink ports of an Industrial Ethernet switch, traffic from one or more machine nodes with pre-configured IP addresses;
performing network address translation on the received traffic;
determining whether the received traffic includes a protocol packet of a protocol that does not work transparently across the network address translation;
fixing up the protocol packet by modifying a payload of the protocol packet when the received traffic includes the protocol packet; and
transmitting, via one or more uplink ports of the Industrial Ethernet switch, the received traffic to one or more external entities.

15. The method of claim 14, wherein the pre-configured IP addresses are selected from a duplicate address range, and wherein performing the network address translation includes translating the pre-configured IP addresses to unique IP addresses selected from a unique address range.

16. The method of claim 14, wherein modifying the payload of the protocol packet includes changing an embedded source IP address of the protocol packet without changing an embedded destination IP address of the protocol packet.

17. The method of claim 16, wherein modifying the payload of the protocol packet includes correcting a cyclic redundancy check of the protocol packet.

18. The method of claim 14, wherein fixing up the protocol packet is performed at a line rate of the Industrial Ethernet switch.

19. A system comprising:
a first machine node with a first pre-configured IP address;
a second machine node with a second pre-configured IP address;
an Industrial Ethernet switch coupled to the first machine node and the second machine node, wherein the Industrial Ethernet switch is configured to:
receive traffic from the first and second machine nodes;
transmit the received traffic over one or more uplinks; and
when the first and second pre-configured IP addresses are duplicate IP addresses, perform network address translation on the received traffic, wherein the network address translation includes:
determining whether the received traffic includes a protocol packet of a protocol that does not work transparently across the network address translation; and
modifying a payload of the protocol packet when the received traffic includes the protocol packet.

20. The system of claim 19, wherein modifying the payload of the protocol packet includes changing an embedded source IP address of the protocol packet to a unique IP address without changing an embedded destination IP address of the protocol packet.

* * * * *